United States Patent
Wei et al.

(10) Patent No.: US 7,190,843 B2
(45) Date of Patent: Mar. 13, 2007

(54) INTEGRATED APPROACH TO BRIGHTNESS AND CONTRAST NORMALIZATION IN APPEARANCE-BASED OBJECT DETECTION

(75) Inventors: Guo-Qing Wei, Plainsboro, NJ (US); Jianzhong Qian, Princeton Junction, NJ (US); John C. Engdahl, Lake Forest, IL (US)

(73) Assignee: Siemens Corporate Research, Inc., Princeton, NJ (US)

( * ) Notice: Subject to any disclaimer, the term of this patent is extended or adjusted under 35 U.S.C. 154(b) by 959 days.

(21) Appl. No.: 10/072,939

(22) Filed: Feb. 1, 2002

(65) Prior Publication Data
US 2003/0147554 A1   Aug. 7, 2003

(51) Int. Cl.
*G06K 9/00* (2006.01)

(52) U.S. Cl. ............... 382/274; 382/118; 382/299; 382/300

(58) Field of Classification Search ............ 382/274, 382/181, 190, 195, 206, 299, 300, 118, 131
See application file for complete search history.

(56) References Cited

U.S. PATENT DOCUMENTS

| | | | |
|---|---|---|---|
| 5,497,430 A * | 3/1996 | Sadovnik et al. | 382/156 |
| 6,711,293 B1 * | 3/2004 | Lowe | 382/219 |
| 2002/0006226 A1 * | 1/2002 | Shiota | 382/203 |

OTHER PUBLICATIONS

Waters et al., Super resolution and image enhancement using novelty concepts, Mar. 1998, IEEE Aerospace Conference, vol. 5, pp. 123-127.*

* cited by examiner

Primary Examiner—Jingge Wu
Assistant Examiner—John B. Strege
(74) Attorney, Agent, or Firm—Donald B Paschburg; F. Chau & Associates, LLC

(57) ABSTRACT

A system and method for appearance-based object detection includes a first portion capable of brightness and contrast normalization for extracting a plurality of training images, finding eigenimages corresponding to the training images, receiving an input image, forming a projection equation responsive to the eigenimages, solving for intensity normalization parameters, computing the projected and normalized images, computing the error-of-fit of the projected and normalized images, thresholding the error-of-fit, and determining object positions in accordance with the thresholded error-of-fit; and optionally includes a second portion capable of forming eigenimages for multiresolution for sub-sampling the training images, forming training images of coarse resolution in accordance with the sub-sampled images, computing eigenimages corresponding to the training images of coarse resolution, interpolating the eigenimages for coarse resolution, performing orthonormalization on the interpolated images by singular value decomposition, and providing pseudo-eigenimages corresponding to the orthonormalized images for a finer resolution.

15 Claims, 4 Drawing Sheets ately extracted and used to find eigenimages in a training procedure. Eigenimages represent the major components of the object's appearance features. In the detection phase, similar appearance features of the objects are recognized by using projections on the eigenimages. Examples of this typical method are common in the art (see, e.g., Turk and Pentland, "Face recognition using eigenfaces" *Proceedings of IEEE Computer Society Conference on Computer Vision and Pattern Recognition*, pp.586–591, 1991). A difficulty with the typical method is that image brightness and contrast values in the detection phase may vary significantly from those values used in the training set, leading to detection failures. Unfortunately, when there is a detection failure using the typical method, the missed image must then be added to the training set and a re-training must be performed.

INTEGRATED APPROACH TO BRIGHTNESS AND CONTRAST NORMALIZATION IN APPEARANCE-BASED OBJECT DETECTION

BACKGROUND

In appearance-based methods for object detection and recognition, typical images representative of the objects under consideration are manually extracted and used to find eigenimages in a training procedure. Eigenimages represent the major components of the object's appearance features. In the detection phase, similar appearance features of the objects are recognized by using projections on the eigenimages. Examples of this typical method are common in the art (see, e.g., Turk and Pentland, "Face recognition using eigenfaces" *Proceedings of IEEE Computer Society Conference on Computer Vision and Pattern Recognition*, pp.586–591, 1991). A difficulty with the typical method is that image brightness and contrast values in the detection phase may vary significantly from those values used in the training set, leading to detection failures. Unfortunately, when there is a detection failure using the typical method, the missed image must then be added to the training set and a re-training must be performed.

In the appearance-based methods, using multiresolution has been a common practice to reduce computational costs in the detection phase. However, eigenimages for each image resolution are first obtained by independent procedures, thereby increasing the computational burden in the training stage.

SUMMARY

These and other drawbacks and disadvantages of the prior art are addressed by a system and method for appearance-based object detection that includes a first portion capable of brightness and contrast normalization and that optionally includes a second portion capable of forming eigenimages for multiresolution.

The first portion capable of brightness and contrast normalization includes sub-portions for extracting a plurality of training images, finding eigenimages corresponding to the training images, receiving an input image, forming a projection equation responsive to the eigenimages, solving for intensity normalization parameters, computing the projected and normalized images, computing the error-of-fit of the projected and normalized images, thresholding the error-of-fit, and determining object positions in accordance with the thresholded error-of-fit.

The optional second portion capable of forming eigenimages for multiresolution includes sub-portions for sub-sampling the training images, forming training images of coarse resolution in accordance with the sub-sampled images, computing eigenimages corresponding to the training images of coarse resolution, interpolating the eigenimages for coarse resolution, performing orthonormalization on the interpolated images by singular value decomposition, and providing pseudo-eigenimages corresponding to the orthonormalized images for a finer resolution.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches an integrated approach to brightness and contrast normalization in appearance-based object detection in accordance with the following exemplary figures, in which.

DETAILED DESCRIPTION OF PREFERRED EMBODIMENTS

In the appearance-based methods for object detection and recognition, typical images of the objects under consideration are manually extracted and used to find eigenimages in a training procedure. In the detection phase, similar appearance features of the objects can then be recognized by using eigenimage projection. Unfortunately, image brightness and contrast may vary from those found in the training set. The usual practice is to add these new images to the training set and to do time-consuming retraining. The present disclosure sets forth an integrated approach to intensity re-normalization during detection, thus avoiding retraining. A new technique for initial multiresolution training is also disclosed.

In order for the eigenimages obtained in the training phase to be useful in detecting objects having different brightness and contrast levels, intensity normalization should be performed. A simple method would be to scale the intensity to a given range. Unfortunately, this simple method runs the risk of having the detection result be highly dependent on the maximum and minimum intensities of the current image, which may happen to be noises or disturbances. What is needed is a systematic method that can automatically normalize the brightness and contrast to achieve optimal detection.

The present disclosure provides a systematic method for image brightness and contrast normalization that is integrated into the detection procedure. The two problems of intensity normalization and detection are formulated in a single optimization procedure. Therefore, intensity normalization and detection are performed simultaneously. Since intensity normalization in this technique is not based on minimum and maximum intensity values, robust detection can be achieved. A method is also disclosed to compute the eigenimages for a finer image resolution based on those of a coarser image resolution. This avoids the need to compute the eigenimages of the full resolution images from scratch, leading to a faster training procedure.

The disclosed techniques are applied to the exemplary heart detection problem in the single-photon emission computed tomography ("SPECT") branch of nuclear medicine. The techniques can also be applied to other application problems such as automatic object detection on assembly lines by machine vision, human face detection in security control, and the like.

Figure 1:
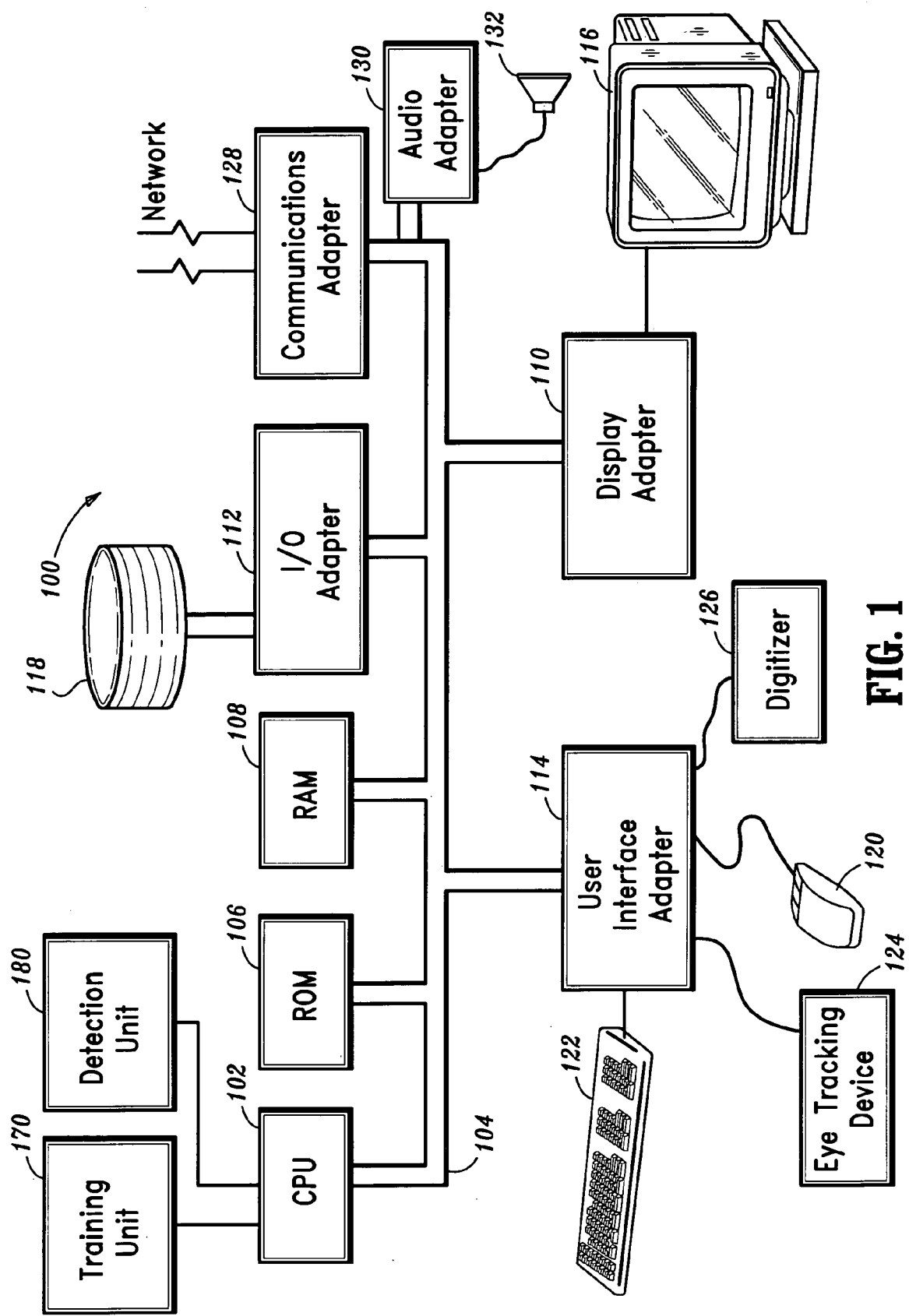
FIG. 1 shows a block diagram of a system for brightness and contrast normalization according to an illustrative embodiment of the present disclosure.

FIG. 1 shows a block diagram of a system 100 for brightness and contrast normalization according to an illustrative embodiment of the present disclosure. The system 100 includes at least one processor or central processing unit ("CPU") 102 in signal communication with a system bus 104. A read only memory ("ROM") 106, a random access memory ("RAM") 108, a display adapter 110, an I/O adapter 112, and a user interface adapter 114 are also in signal communication with the system bus 104.

A display unit 116 is in signal communication with the system bus 104 via the display adapter 110. A disk storage unit 118, such as, for example, a magnetic or optical disk storage unit, is in signal communication with the system bus 104 via the I/O adapter 112. A mouse 120, a keyboard 122, and an eye tracking device 124 are also in signal communication with the system bus 104 via the user interface adapter 114. The mouse 120, keyboard 122, and eye-tracking device 124 are used to aid in the generation of selected regions in a digital medical image.

An off-line training unit 170 and an on-line detection unit 180 are also included in the system 100 and in signal communication with the CPU 102 and the system bus 104. While the off-line training unit 170 and the on-line detection unit 180 are illustrated as coupled to the at least one processor or CPU 102, these components are preferably embodied in computer program code stored in at least one of the memories 106, 108 and 118, wherein the computer program code is executed by the CPU 102.

The system 100 may also include a digitizer 126 in signal communication with the system bus 104 via a user interface adapter 114 for digitizing an image. Alternatively, the digitizer 126 may be omitted, in which case a digital image may be input to the system 100 from a network via a communications adapter 128 in signal communication with the system bus 104, or via other suitable means as understood by those skilled in the art.

As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the off-line training unit 170 and the on-line detection unit 180, as well as the other elements of the system 100, while practicing within the scope and spirit of the present disclosure.

Figure 2:
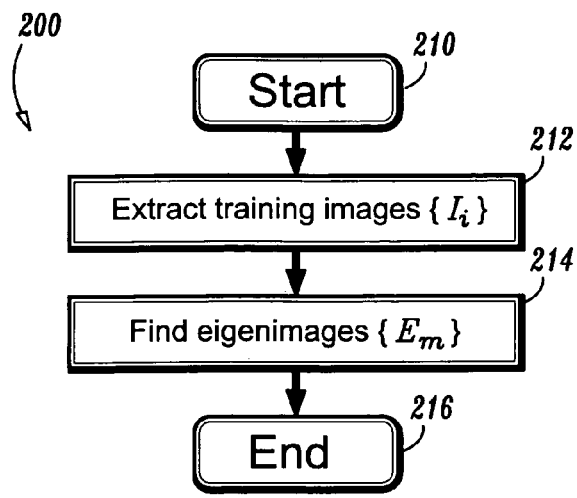
FIG. 2 shows a flow diagram for off-line training in accordance with the system of FIG. 1.

Turning to FIG. 2, a flowchart for off-line training by eigenimage decomposition is indicated generally by the reference numeral 200. A start block 210 passes control to a function block 212 for extracting the training images. A function block 214 receives the extracted images from the block 212, determines the associated eigenimages, and passes control to an end block 216.

Figure 3:
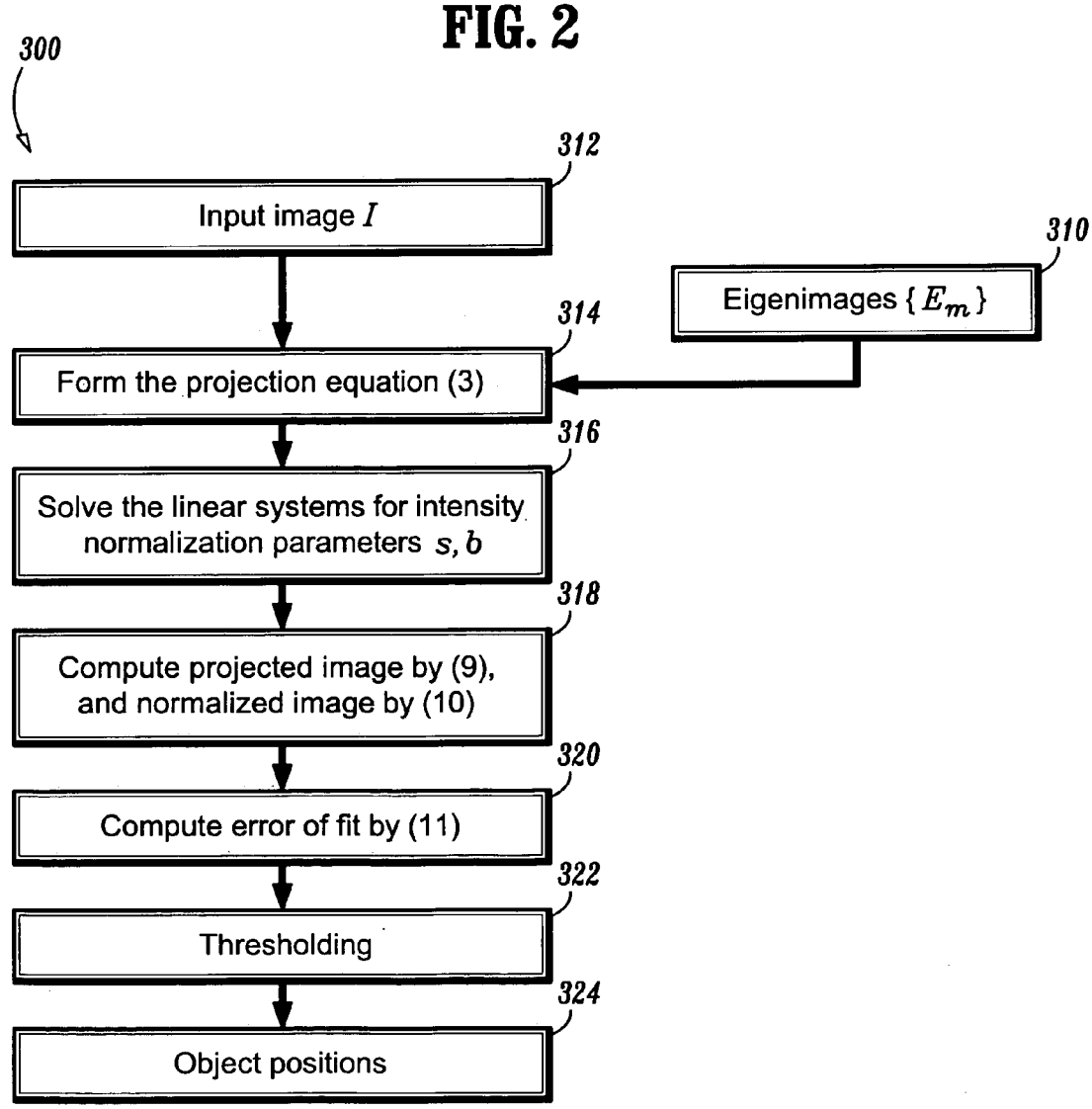
FIG. 3 shows a flow diagram for on-line object detection for use in connection with the off-line training of FIG. 2.

In FIG. 3, a flowchart for on-line detection with brightness and contrast normalization is indicated generally by the reference numeral 300. Eigenimages previously developed during off-line training are received at a function block 310. A function block 312 receives input images for analysis, and leads to a function block 314. The function block 314 forms projection equations of the eigen-images onto the input images according to equation number 3, described below, and leads into a function block 316. Block 316 solves the linear equations for intensity normalization parameters, and leads to a function block 318. Block 318 computes a projected image according to equation number 9, described below, and computes a normalized image according to equation number 10, also described below. A function block 320 follows block 318, computes the error of fit according to equation number 11, described below, and leads to a function block 322. Block 322 performs thresholding and leads to a function block 324, which determines the object positions.

Figure 4:
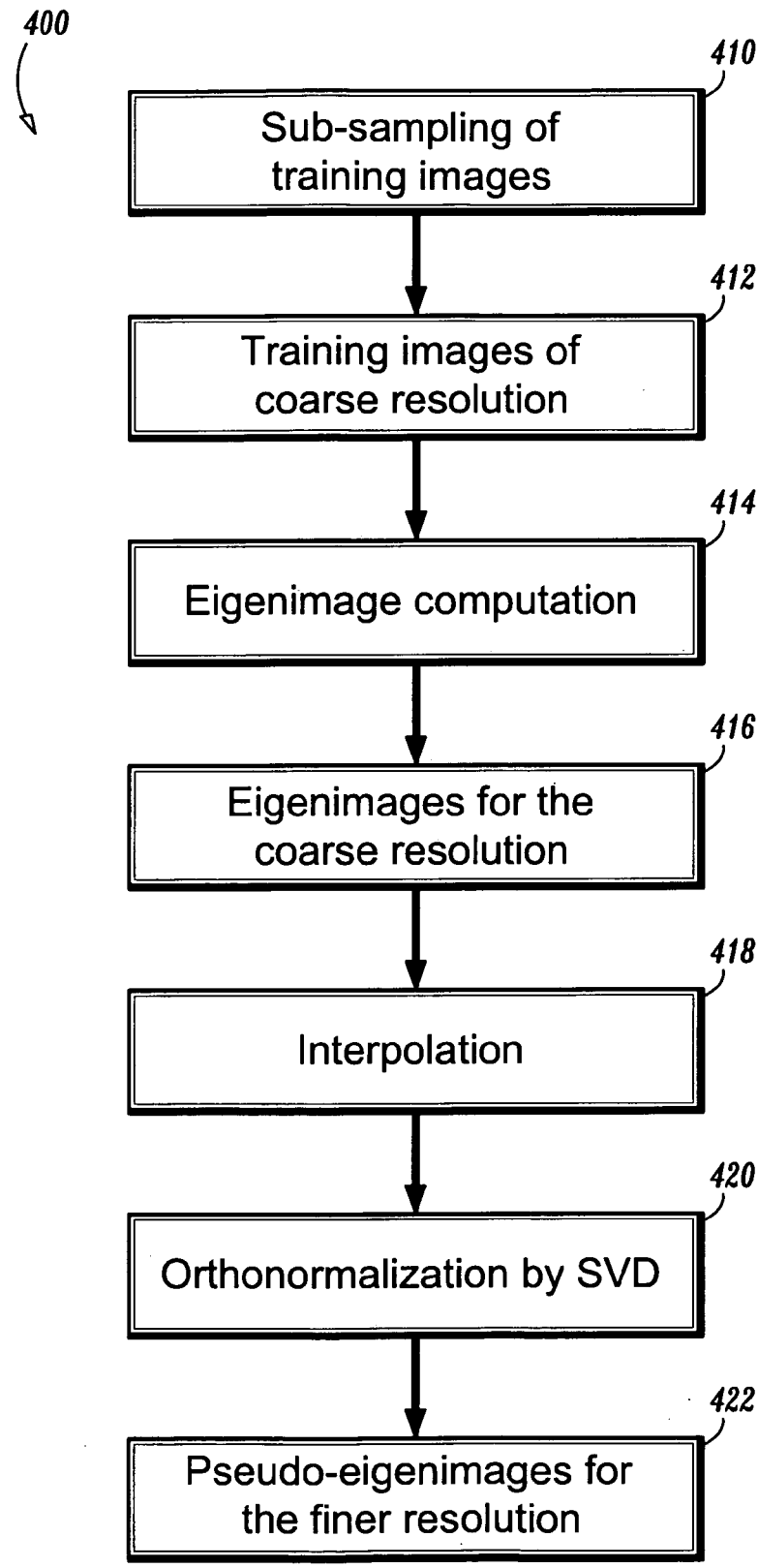
FIG. 4 shows a flow diagram for eigenimage computation for use in connection with the off-line training of FIG. 2.

Turning now to FIG. 4, the function block 214 of FIG. 2 is further defined by a flow diagram for eigenimage computation based on sub-sampled images, generally indicated by the reference numeral 400. A function block 410 performs a sub-sampling of training images, and leads to a function block 412. Block 412 receives training images of coarse resolution, and leads to a function block 414. Block 414 computes eigenimages, and leads to a function block 416. The block 416 receives eigenimages for the coarse resolution, and leads to a function block 418. The block 418 performs interpolation of the eigen-images, and leads into a function block 420, which performs orthonormalization by singular value decomposition ("SVD"). A function block 422 follows the block 420 and provides pseudo-eigenimages for a finer resolution.

Figure 7:
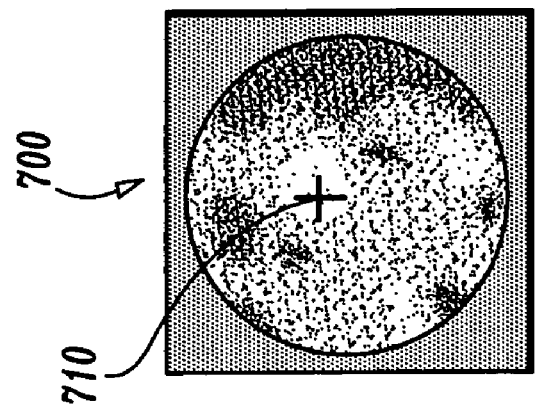
FIG. 7 shows a detected heart position overlaid on the original image of FIG. 5.
Figure 6:
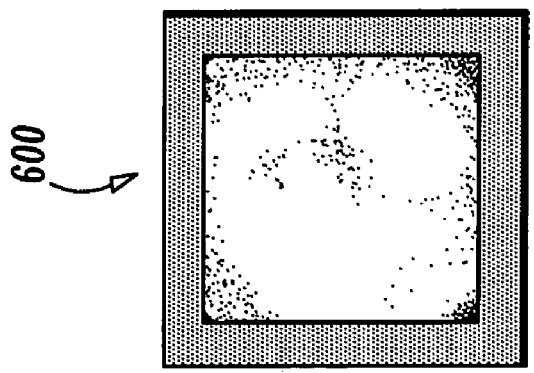
FIG. 6 shows a score image derived from the original image of FIG. 5.
Figure 5:
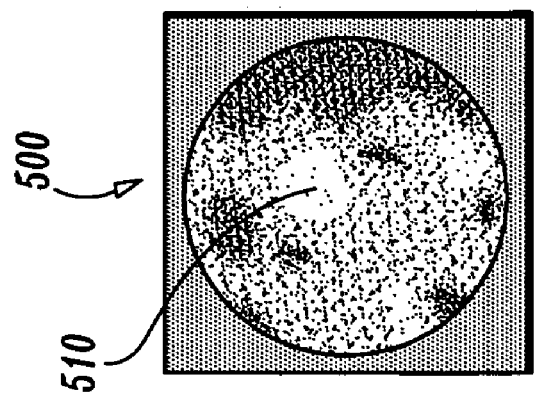
FIG. 5 shows an exemplary original image for use in a heart detection application.

As shown in FIG. 5, an original SPECT image is indicated generally by the reference numeral 500. The image 500 includes a relatively lighter area 510. Turning to FIG. 6, a score image is indicated generally by the reference numeral 600. The score image is computed as the negative of the error of fit defined below by equation number 11, and brighter pixels represent higher scores. As shown in FIG. 7, the image indicated generally by the reference numeral 700 comprises the original image 500 with a detected heart position indicated by the point 710, marked by a crosshair overlay.

In operation with respect to FIGS. 2 through 4, an integrated approach to intensity normalization uses an appearance-based approach for object detection that involves two steps: off-line training 200 and on-line detection 300. In the off-line training stage 200, a set of sample images of the object type are manually extracted to form a training set at block 212. This set of training images is denoted by $T=\{I_i(x,y), i=1,2,\ldots,N\}$, where N is the number of training images.

Next, principle component analysis is used to find the prototypes or eigenimages $\{E_m, m=1,2,\ldots,M\}$ from the training images at function block 214, where M is the number of eigenimages, and M<N. Images belonging to the training set can then be approximated by the eigenimages as:

$$I \approx E_0 + \sum_{m=1}^{M} \alpha_m E_m, I \in T, \quad (1)$$

where $E_0$ is the average image of $\{I_i(x,y)\}$, the parameters $\{\alpha_m\}$ are determined by:

$$\alpha_m = (I-E_0) \cdot E_m \quad (2)$$

where the symbol "•" is a dot product. FIG. 2, introduced above, shows the flow diagram for the off-line training.

In the detection stage 300 of FIG. 3, each image pixel within a region of interest is examined. A sub-image centered at the pixel under consideration is taken. The sub-image should have the same size as that of the training images. This sub-image was typically directly projected onto the eigen-images according to equation 1 in the prior art. Unfortunately, the brightness and contrast of the current image may be quite different from those in the training image set, in which case equation 1 does not hold. Therefore, the projection operation is modified in the present embodiment by adding a scaling and a shift to the image intensity, so that the new projection equation takes the following form:

$$sI + bU \approx E_0 + \sum_{m=1}^{M} \alpha_m E_m, \qquad (3)$$

where s and b are the scaling and shift parameters, respectively; U is a matrix of the same size as I, with all elements being 1; and 1 is the current sub-image. The parameters s and b are unknown and need to be estimated during the projection operation. The problem is formulated as finding the parameters $s, b, a_m, m=1, \ldots, M$, such that the residual error of equation number 3 is minimized. This is achieved by the following method:

Based on the orthonormality of $E_m$, i.e., $$E_j \cdot E_k = \begin{cases} 1, & j = k \\ 0, & j \neq k \end{cases} \qquad (4)$$

the parameters $\alpha_m$'s are expressed through dot-producting both sides of equation 3 by $E_m$, as:

$$E_m \cdot (sI + bU) \approx E_m \cdot \left( E_0 + \sum_{m=1}^{M} \alpha_m E_m \right) \qquad (5)$$

This gives, according to equation 4:

$$\alpha_m = (sI + bU) \cdot E_m - E_0 \cdot E_m \qquad (6)$$
$$= sI \cdot E_m + bU \cdot E_m - E_0 \cdot E_m$$

Inserting equation 6 into equation 3 yields:

$$kI + bU = \qquad (7)$$
$$E_0 + s\left( \sum_{m=1}^{M} (I \cdot E_m)E_m \right) + b\left( \sum_{m=1}^{M} (U \cdot E_m)E_m \right) - \left( \sum_{m=1}^{M} (E_0 \cdot E_m)E_m \right)$$

The above equation can be rearranged to get a linear system of equations on k and b as:

$$\left( I - \left( \sum_{m=1}^{M} (I \cdot E_m)E_m \right) \right)s + \left( U - \left( \sum_{m=1}^{M} (U \cdot E_m)E_m \right) \right)b = \qquad (8)$$
$$E_0 - \left( \sum_{m=1}^{M} (E_0 \cdot E_m)E_m \right)$$

These equations can be solved for k and b by the least-squares method as known in the art. The obtained k and b are inserted into the right hand side of equation 7 to get the projected component of the image under consideration:

$$I_p = E_0 + s\left( \sum_{m=1}^{M} (I \cdot E_m)E_m \right) + b\left( \sum_{m=1}^{M} (U \cdot E_m)E_m \right) - \left( \sum_{m=1}^{M} (E_0 \cdot E_m)E_m \right) \qquad (9)$$

At the same time, the intensity-normalized image can be computed as:

$$\hat{I} = kI + bU \qquad (10)$$

To measure how well the image I can be represented by the eigenimages, an error of fit is computed as:

$$e = \|\hat{I} - I_p\| \qquad (11)$$

Then, occurrences of the object to be detected can be defined as those image pixels wherein the error-of-fit, as defined above, falls below a predefined threshold. Thus, FIG. 3 shows a flow diagram for an integrated approach to intensity normalization and object detection.

Returning to FIG. 4, multiresolution eigenimage approximation is described. When multiresolution was used only in the detection phase, eigen-images corresponding to each image resolution had to be computed. The usual practice has been to sub-sample the training images to different resolutions and compute the eigenimages at each image resolution independently. In the present disclosure, an approximate solution is provided which computes eigen images of a finer resolution based on the eigen images of the coarser resolution. First, the eigenimages corresponding to the lowest resolution are computed. Then these eigen images are interpolated to have the image size of a finer resolution. The interpolated eigenimages are called pseudo-eigenimages. These pseudo-eigenimages are no longer orthonormal, that is, they do not satisfy equation 4. To retain orthonormality of the pseudo-eigenimages, a singular value decomposition ("SVD") is applied, which finds a set of orthonormal images in the space spanned by the pseudo-eigenimages. This new set of images is used as the eigenimage set for the finer resolution. The amount of computational savings in performing this SVD is enormous in comparison with the SVD from the original training image. For a 64×64 sized image, the original SVD needed to be performed on a matrix of 4096×4096, whereas, with this improved method, a SVD on a matrix of only 4096×K is needed, where K is the number of eigenimages chosen in the coarser resolution, which is usually in the order of 10 to 20. Since the eigenimages do not represent the eigenvectors corresponding to the largest eigenvalues, this provides only an approximate method for eigenimage-based detection. Thus, FIG. 4 shows a flow diagram for the presently disclosed computational procedure. Returning now to FIGS. 5 through 7, these are now seen to illustrate an example of heart detection on a SPECT image according to an embodiment of the present disclosure wherein FIG. 5 shows the original image and FIG. 6 shows the score image computed as the negative of the error of fit defined by equation 11. In score images, brighter pixels represent higher scores. FIG. 7 shows the detected heart position, indicated by a pair of crosshairs overlaid on the original image of FIG. 5. The heart position is found by searching for the maximum in the score image of FIG. 6.

The disclosed technique can be applied to many appearance-based object detection problems. Alternate examples include automatic object detection on assembly lines by machine vision, human face detection in security control, and the like.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and method function blocks depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for brightness and contrast normalization in appearance-based object detection, the method comprising:
   extracting a plurality of training images;
   finding eigenimages corresponding to the training images;
   receiving an input image;
   forming a projection equation responsive to the eigenimages by adding a scaling and a shift to image intensity and simultaneously solving for intensity normalization parameters;
   computing projected and normalized images;
   computing an error-of-fit of the projected and normalized images;
   thresholding the error-of-fit; and
   determining object positions in accordance with the thresholded error-of-fit,
   wherein finding eigenimages comprises:
      sub-sampling the training images;
      forming training images of coarse resolution in accordance with the sub-sampled images;
      computing eigenimages corresponding to the training images of coarse resolution;
      interpolating the eigenimages for coarse resolution;
      performing orthonormalization on the interpolated images by singular value decomposition; and
      providing pseudo-eigenimages corresponding to the orthonormalized images for a finer resolution.

2. A method as defined in claim 1 wherein at least one of said plurality of training images and said input image comprises a single-photon emission computed tomography image.

3. A method as defined in claim 1 wherein the computed error-of-fit is represented by a score image.

4. A method for brightness and contrast normalization in appearance-based object detection, the method comprising:
   extracting a plurality of training images;
   finding eigenimages corresponding to the training images;
   receiving an input image;
   forming a projection equation responsive to the eigenimages by adding a scaling and a shift to image intensity and simultaneously solving for intensity normalization parameters;
   computing projected and normalized images;
   computing an error-of-fit of the projected and normalized images;
   thresholding the error-of-fit; and
   determining object positions in accordance with the thresholded error-of-fit,
   further comprising forming eigenimages for multiresolution, including:
      sub-sampling a plurality of training images;
      forming training images of coarse resolution in accordance with the sub-sampled images;
      computing coarse eigenimages corresponding to the training images of coarse resolution;
      interpolating the coarse eigenimages for a finer resolution;
      orthonormalizing the interpolated images; and
      providing pseudo-eigenimages corresponding to the orthonormalized images for a finer resolution,
      wherein the pseudo-eigenimages are formed with a projection equation responsive to the coarse eigenimages by adding a scaling and a shift to image intensity.

5. A method as defined in claim 4 wherein orthonormalizing the interpolated images comprises performing a singular value decomposition.

6. A system for brightness and contrast normalization in appearance-based object detection, the system comprising:
   extraction means for extracting a plurality of training images;
   finding means for finding eigenimages corresponding to the training images;
   receiving means for receiving an input image;
   forming/solving means for forming a projection equation responsive to the eigenimages by adding a scaling and a shift to image intensity and simultaneously solving for intensity normalization parameters;
   computing means for computing projected and normalized images;
   fitting means for computing an error-of-fit of the projected and normalized images;
   thresholding means for thresholding the error-of-fit; and
   determining means for determining object positions in accordance with the thresholded error-of-fit,
   wherein said finding means comprises:
      sub-sampling means for sub-sampling the training images;

training means for forming training images of coarse resolution in accordance with the sub-sampled images;

eigenimaging means for computing eigenimages corresponding to the training images of coarse resolution;

interpolating means for interpolating the eigenimages for coarse resolution;

orthonormalization means for performing orthonormalization on the interpolated images by singular value decomposition; and pseudo-eigenimaging means for providing pseudo-eigenimages corresponding to the orthonormalized images for a finer resolution.

7. A system as defined in claim 6 wherein at least one of said plurality of training images and said input image comprises a single-photon emission computed tomography image.

8. A system as defined in claim 6 wherein the computed error-of-fit is represented by a score image.

9. A system for brightness and contrast normalization in appearance-based object detection, the system comprising:

extraction means for extracting a plurality of training images;

finding means for finding eigenimages corresponding to the training images;

receiving means for receiving an input image;

forming/solving means for forming a projection equation responsive to the eigenimages by adding a scaling and a shift to image intensity and simultaneously solving for intensity normalization parameters;

computing means for computing projected and normalized images;

fitting means for computing an error-of-fit of the projected and normalized images;

thresholding means for thresholding the error-of-fit; and determining means for determining object positions in accordance with the thresholded error-of-fit;

means for forming eigenimages for multiresolution, including:

sub-sampling means for sub-sampling a plurality of training images;

training means for forming training images of coarse resolution in accordance with the sub-sampled images;

eigenimaging means for computing coarse eigenimages corresponding to the training images of coarse resolution;

interpolating means for interpolating the coarse eigenimages for a finer resolution;

orthonormalizing means for orthonormalizing the interpolated images; and pseudo-eigenimaging means for providing pseudo-eigenimages corresponding to the orthonormalized images for a finer resolution, wherein the pseudo-eigenimages are formed with a projection equation responsive to the coarse eigenimages by adding a scaling and a shift to image intensity.

10. A system as defined in claim 9 wherein said orthonormalizing means comprises decomposition means for performing a singular value decomposition.

11. A program storage device readable by machine, tangibly embodying a program of instructions executable by the machine to perform method steps for brightness and contrast normalization in appearance-based object detection, the method steps comprising:

extracting a plurality of training images;

finding eigenimages corresponding to the training images;

receiving an input image;

forming a projection equation responsive to the eigenimages by adding a scaling and a shift to image intensity and simultaneously solving for intensity normalization parameters;

computing projected and normalized images;

computing an error-of-fit of the projected and normalized images;

thresholding the error-of-fit; and determining object positions in accordance with the thresholded error-of-fit, wherein the program step of finding eigenimages comprises:

sub-sampling the training images;

forming training images of coarse resolution in accordance with the sub-sampled images;

computing eigenimages corresponding to the training images of coarse resolution;

interpolating the eigenimages for coarse resolution;

performing orthonormalization on the interpolated images by singular value decomposition; and providing pseudo-eigenimages corresponding to the orthonormalized images for a finer resolution.

12. A program storage device as defined in claim 11 wherein at least one of said plurality of training images and said input image comprises a single-photon emission computed tomography image.

13. A program storage device as defined in claim 11 wherein the computed error-of-fit is represented by a score image.

14. A program storage device readable by machine, tangibly embodying a program of instructions executable by the machine to perform method steps for brightness and contrast normalization in appearance-based object detection, the method steps comprising:

extracting a plurality of training images;

finding eigenimages corresponding to the training images;

receiving an input image;

forming a projection equation responsive to the eigenimages by adding a scaling and a shift to image intensity and simultaneously solving for intensity normalization parameters;

computing projected and normalized images;

computing an error-of-fit of the projected and normalized images;

thresholding the error-of-fit; and determining object positions in accordance with the thresholded error-of-fit, further comprising method steps for forming eigenimages for multiresolution, including:

sub-sampling a plurality of training images;

forming training images of coarse resolution in accordance with the sub-sampled images;

computing coarse eigenimages corresponding to the training images of coarse resolution;

interpolating the coarse eigenimages for a finer resolution;

orthonormalizing the interpolated images; and providing pseudo-eigenimages corresponding to the orthonormalized images for a finer resolution,
wherein the pseudo-eigenimages are formed with a projection equation responsive to the coarse eigenimages by adding a scaling and a shift to image intensity.

15. A program storage device as defined in claim 14 wherein the program step of orthonormalizing the interpolated images comprises performing a singular value decomposition.

* * * * *